June 2, 1925.
E. A. EIBAND
1,540,685
COMBINATION AUTOMOBILE CUSHION AND PILLOW
Filed March 13, 1923　　2 Sheets-Sheet 1
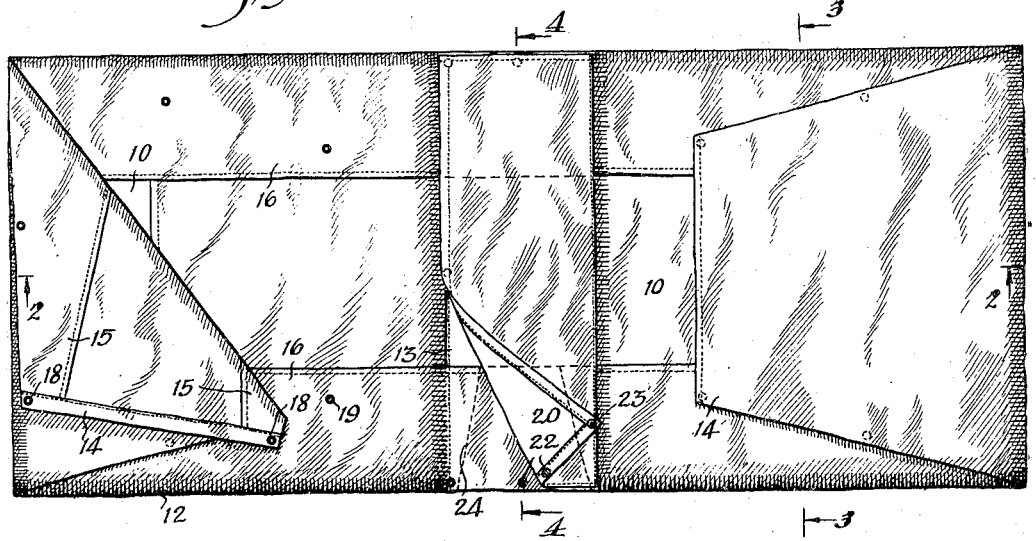
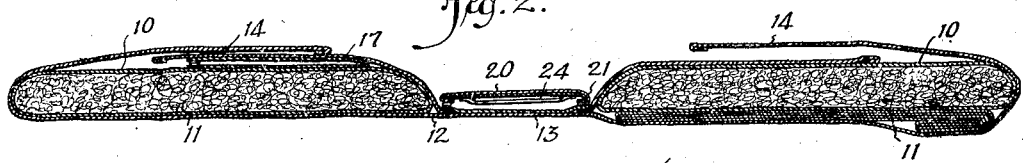
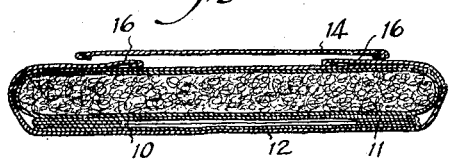
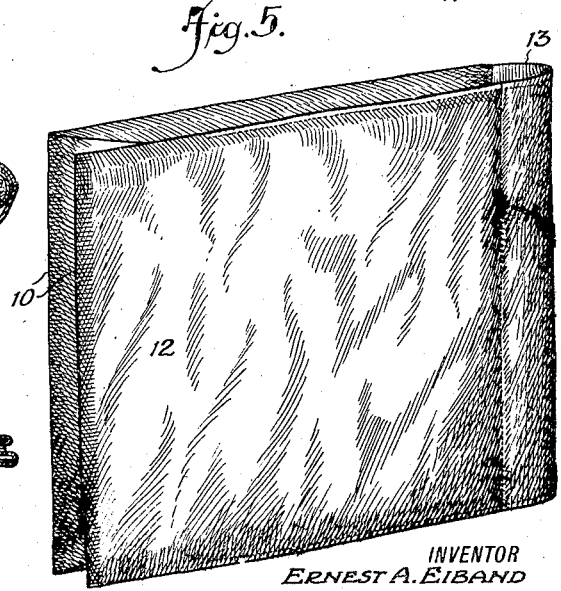
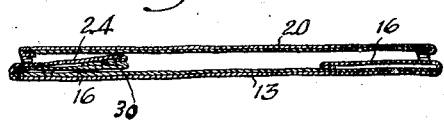
INVENTOR
ERNEST A. EIBAND
ATTORNEYS June 2, 1925.

E. A. EIBAND 1,540,685

COMBINATION AUTOMOBILE CUSHION AND PILLOW

Filed March 13, 1923    2 Sheets-Sheet 2

WITNESSES

INVENTOR
ERNEST A. EIBAND

BY

ATTORNEYS

Patented June 2, 1925.

1,540,685

UNITED STATES PATENT OFFICE.

ERNEST A. EIBAND, OF NEW BRAUNFELS, TEXAS.

COMBINATION AUTOMOBILE CUSHION AND PILLOW.

Application filed March 13, 1923. Serial No. 624,863.

*To all whom it may concern:*

Be it known that I, ERNEST A. EIBAND, a citizen of the United States of America, and a resident of New Braunfels, in the county of Comal and State of Texas, have invented new and Improved Combination Automobile Cushions and Pillows, of which the following is a description.

My invention relates to an article adapted to be employed as an automobile cushion to be adjusted into various forms to have considerable length as well as to be disposed that a portion of the article forms a back rest, the remainder forming a cushion upon which an occupant of the automobile may be seated or to be given a form suitable for laying an infant thereupon.

The general object of my invention is to provide an article of the indicated character readily adjusted to assume different forms for variously using the article, a further object being to provide a combination cushion and pillow having a novel arrangement of pockets for the reception of various toilet articles or conveniences.

The nature of the invention, its distinguishing features and advantages will clearly appear as the description proceeds.

Reference is to be had to the accompanying drawings forming a part of this specification, it being understood that the drawings are merely illustrative of one example of the invention.

Figure 1 is a plan view of my combination cushion and pillow showing the same in a completely unfolded form, portions of certain flaps being turned back;

Figure 2 is a longitudinal section as indicated by the line 2—2, Figure 1;

Figure 6:
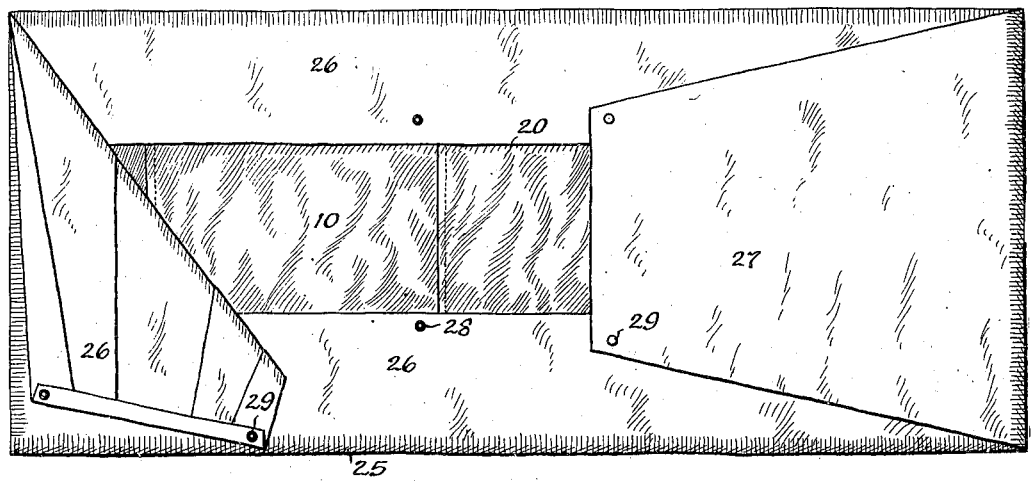
Figure 7:
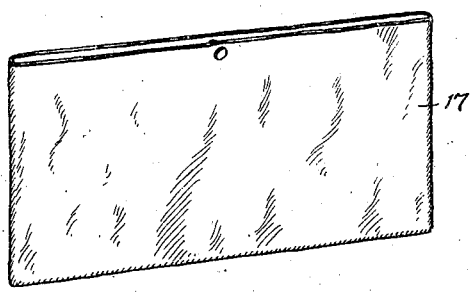

Figures 3 and 4 are cross sections respectively on the lines 3—3 and 4—4, Figure 1;

Figure 5 is a perspective view of the cushion folded one end onto the other;

Figure 6 is a view similar to Figure 1 showing my improved cushion with an additional protective covering applied thereto;

Figure 7 is a perspective view of a waterproof pocket to be employed in the cushion and adapted for holding towels or the like.

In carrying out my invention in accordance with the illustrated example two separate cushions 10 are provided at the respective ends of the article, the numeral 11 indicating the stuffing material of said cushions which stuffing may be of any suitable material. The cushions 10 are connected by a covering fabric 12 in a manner to leave the cushions separated by an intermediate connecting section of the fabric 12 as indicated at 13.

The material 12 covers the cushions 10 at the under sides and the free ends of the material 12 are in the form of flaps 14 adapted to be folded over the top or front of the cushions 10. The flaps 14 have their side edges turned over as at 15 shown at the left of Figure 1. The outer covering material 12 at the sides is turned over onto the cushions 10 as at 16 and said turned-over portions are left free and unsecured to the cushions so that the turned-over portions 15 of the flaps 14 and the folded-over side members 16 constitute pockets. The pockets associated with one cushion may be employed for example to hold clean towels, and the pockets associated with the other cushion to hold soiled towels.

In Figure 7 I have shown a separate pocket or envelope 17 which in practice is made of rubber or other waterproof material and said holder 17 is adapted to be slipped into place beneath the cover portion of a cushion as indicated in Figure 2. The end flaps 14 have suitable fastener elements 18 adapted to engage coacting fastener elements 19 on the side flaps 16.

At the connecting web 13 between the two cushion portions 10 I provide an elongated pocket extending transversely between the cushions for substantially the complete area of the connecting web 13. Said pocket is provided by reason of a flap 20 secured along one edge to the edge portion of the connecting web 13 as at 21 and free at its opposite edge as indicated by the turned-over portion shown in Figure 1. Said flap 20 covers the side portions 16 of the cover 12 at the webbing 13 and coacting fastener elements 22, 23 are provided on said flap 20 and on the adjacent covering material 12. A secret pocket 24 is formed at one end of the connecting webbing 13 beneath the side portion 16 to be covered in addition by the flap 20. At all events, in practice I make the material of the flap 20 and the webbing 13 of waterproof material so that the pocket formed thereby between the cushions is waterproof. The cover 12 may be formed of fabric, leather, or other suitable material.

In addition to the cover material 12 I employ in practice a separate foldable cover 25 which advantageously may be formed of paper. Said cover 25 is formed with side flaps 26 folded over onto the cushion assemblage including the cover material 12 and formed also with end flaps 27. The side flaps 26 and end flaps 27 have coacting fastener elements 28, 29. The cover 25 is of comparatively stiff paper or the like. Said cover may be folded within the cover 12 and in that case the cover 25 acts as a stiffener and sustains either cushion portion 10 in an upright position as a back rest.

In practice the cover 25 when not required for use is folded and held in a pocket formed between the cushion and the cover material 12 at the under side of one or other of the cushions. Said cover 25 may, however, be placed beneath the side flaps 16 and end flaps 14.

The pocket 24 has an inturned flap 30 at the open end to assist in retaining articles in the pocket.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A combined cushion and pillow comprising a pair of separate cushions, and covering material over said cushions and forming a web connecting the same; together with side flaps turned inward and stitched over the cushions, and end flaps folded inward and detachably fastened over the cushions.

2. A combined cushion and pillow comprising a pair of separate cushions, and covering material over said cushions and forming a web connecting the same; together with side flaps turned inward and stitched over the cushions, and end flaps folded inward and detachably fastened over the cushions, said side flaps extending over the connecting web between the pair of cushions.

3. A combined cushion and pillow comprising a pair of separate cushions, covering material over said cushions and forming a web connecting the same, and a flap secured along one edge adjacent to one edge of said web and forming with said web a pocket between said cushions.

4. A combined cushion and pillow comprising a pair of separate cushions, covering material over said cushions and forming a web connecting the same, and a flap secured along one edge adjacent to one edge of said web and forming with said web a pocket between said cushions; together with side flaps turned inward and stitched over the cushions, and end flaps folded inward and detachably fastened over the cushions, and end flaps on said covering material foldable over said flaps.

5. In a combined cushion and pillow, separate cushions, a connecting web between the cushions, a flap over said web and secured to the web along an edge of the flap adjacent to the transverse line joining the web with one of said cushions, and a pocket on top of the web at one end of said web and covered by said flap, said pocket having a concealing flap beneath the first flap and turned under the pocket between the latter and the web.

6. A combined cushion and pillow comprising a pair of separate cushions, and covering material over said cushions and forming a web connecting the same; together with side flaps turned inward and stitched over the cushions, and end flaps folded inward and detachably fastened over the cushions; as well as a removable cover adapted to extend over said separated cushions and web at one side and formed with side and end portions adapted to fold over the cushion and web at the opposite side.

7. A combined cushion and pillow comprising a pair of separate cushions, and covering material over said cushions and forming a web connecting the same; together with side flaps turned inward and stitched over the cushions, and end flaps folded inward and detachably fastened over the cushions; as well as a removable cover adapted to extend over said separating cushions and web at one side and formed with side and end portions adapted to fold over the cushion and web at the opposite side; and a removable pocket accommodated beneath the side flaps and end flaps of the covering material between the same and one of said cushions.

ERNEST A. EIBAND.